United States Patent
Jagtap et al.

(10) Patent No.: US 9,450,955 B2
(45) Date of Patent: Sep. 20, 2016

(54) AUTHENTICATOR FOR USER STATE MANAGEMENT

(71) Applicant: Oracle International Corporation, Redwood Shores, CA (US)

(72) Inventors: Achyut Ramchandra Jagtap, Sunnyvale, CA (US); Gregory Alan Wilson, Austin, TX (US); Shailesh Kumar Mishra, Gopalganj (IN)

(73) Assignee: Oracle International Corporation, Redwood Shores, CA (US)

( * ) Notice: Subject to any disclaimer, the term of this patent is extended or adjusted under 35 U.S.C. 154(b) by 56 days.

(21) Appl. No.: 14/596,097

(22) Filed: Jan. 13, 2015

(65) Prior Publication Data

US 2015/0199500 A1 Jul. 16, 2015

Related U.S. Application Data

(60) Provisional application No. 61/926,872, filed on Jan. 13, 2014, provisional application No. 61/926,864, filed on Jan. 13, 2014, provisional application No. 61/926,882, filed on Jan. 13, 2014.

(51) Int. Cl.
    G06F 17/00    (2006.01)
    H04L 29/06    (2006.01)
    G06F 21/45    (2013.01)

(52) U.S. Cl.
    CPC ............. *H04L 63/083* (2013.01); *G06F 21/45* (2013.01); *H04L 63/20* (2013.01)

(58) Field of Classification Search
    CPC ...... H04L 63/083; H04L 63/20; H06F 21/45
    USPC .......................................................... 726/1
    See application file for complete search history.

(56) References Cited

U.S. PATENT DOCUMENTS

| 5,596,744 A | 1/1997 | Dao et al. |
| 5,943,671 A | 8/1999 | Kleewein et al. |
| 7,293,099 B1 | 11/2007 | Kalajan |

(Continued)

OTHER PUBLICATIONS

Netwrix Identity Management Suite. Data Sheet [online]. Dec. 28, 2014, NetWrix Corporation [retrieved on Dec. 30, 2014]. Retrieved from the Internet: <URL: http://netwrix-corporation.ab-archive.net/software/netwrix-identity-management-suite.html>, 3 pages.

(Continued)

*Primary Examiner* — Teshome Hailu
(74) *Attorney, Agent, or Firm* — Kilpatrick Townsend & Stockton LLP

(57) ABSTRACT

Different types of soft-lockout policies can be associated with different organizations (or groups) in an identity management system. Each soft-lockout policy can indicate different parameters such as a number of login attempts allowed and an amount of time that a user account will be locked-out if the maximum allowed attempts are exceeded unsuccessfully. Users can be associated with the different organizations. For each user, the soft-lockout policies for the organization with which that user is associated are applied to that user when that user attempts to log in. Thus, different groups of users can be handled with different security behaviors regarding unsuccessful login attempts. If, for example, a user were to become moved from one organization to another, then the soft-lockout policies associated with the user's new organization would become applicable to that user.

16 Claims, 10 Drawing Sheets

(56) References Cited

U.S. PATENT DOCUMENTS

| | | | |
|---|---|---|---|
| 7,346,923 | B2 | 3/2008 | Atkins et al. |
| 7,730,034 | B1 | 6/2010 | Deflaux et al. |
| 7,865,537 | B2 * | 1/2011 | Kodama ............ G06F 17/30165 707/822 |
| 8,051,094 | B2 | 11/2011 | Agrawal et al. |
| 8,463,819 | B2 | 6/2013 | Shashikumar et al. |
| 8,738,923 | B2 | 5/2014 | Kottahachchi |
| 8,812,861 | B2 | 8/2014 | Osborn et al. |
| 2007/0260622 | A1 | 11/2007 | Mishra |
| 2008/0168539 | A1 | 7/2008 | Stein |
| 2012/0023568 | A1 | 1/2012 | Cha et al. |
| 2014/0059641 | A1 * | 2/2014 | Chapman, II ......... G06F 21/554 726/1 |
| 2014/0379879 | A1 * | 12/2014 | Bartlett ............. G06Q 10/0633 709/220 |
| 2015/0012548 | A1 * | 1/2015 | Oral ...................... G06Q 50/01 707/751 |
| 2015/0371027 | A1 * | 12/2015 | Kitajima ............. G06F 12/1483 711/103 |
| 2015/0373054 | A1 * | 12/2015 | Chapman, II ......... G06F 21/554 726/1 |

OTHER PUBLICATIONS

Ballard et al. Managing Identity and Authorization Policies for Linux-Based Infrastructures. Red Hat Enterprise Linux 7 Linux Domain Identity, Authentication, and Policy Guide [online]. Copyright 2015 Red Hat [retrieved on Dec. 31, 2014]. Retrieved from the Internet: <URL: https://access.redhat.com/documentation/en-US/Red_Hat_Enterprise_Linux/7/Linux_Domain_Identity_Authentication_and_Policy_Guide/Red_Hat_Enterprise_Linux-7-Linux_Domain_Identity_Authentication_and_Policy_Guide-en-US.pdf>, 420 pages.

AD DS: Fine-Grained Password Policies. Microsoft.com [online]. Oct. 19, 2012, Copyright 2014 Microsoft [retrieved on Dec. 30, 2014]. Retrieved from the Internet: <URL: http://technet.microsoft.com/en-us/library/cc770394%28d=printer, v=ws.10%29.aspx>, 4 pages.

Identity Management Suite—audit and AD management tools—Account Lockout Analyzer. passwordcc.com [online]. Copyright 2014 XuiS Ltd [retrieved Dec. 30, 2014]. Retrieved from the Internet: <URL: http://www.passwordcc.com/IMS/index.html#content5>, 2 pages.

* cited by examiner

AUTHENTICATOR FOR USER STATE MANAGEMENT

CROSS-REFERENCES TO RELATED APPLICATIONS

The present application claims priority under 35 U.S.C §119(e) to U.S. Provisional Patent Application Ser. No. 61/926,872, filed Jan. 13, 2014, and titled "AUTHENTICATOR FOR USER STATE MANAGEMENT", the entire contents of which are incorporated by reference herein; U.S. Provisional Patent Application Ser. No. 61/926,864, filed Jan. 13, 2014, and titled "PROPAGATING REQUESTOR INFORMATION TO AUDITS FOR SMPL CALLS", the entire contents of which are incorporated by reference herein; and U.S. Provisional Patent Application Ser. No. 61/926,882, filed Jan. 13, 2014, and titled "IDENTITY PASSWORD FRAMEWORK (IPF)", the entire contents of which are incorporated by reference herein.

BACKGROUND OF THE INVENTION

With the explosive growth in networked communications and ever increasing collaboration and mobile computing needs, today's enterprises struggle to determine the resources to which their various users have access. Today's enterprises struggle to determine what their users are doing with that access. A comprehensive awareness of access and enforcing governance controls helps to reduce the risk that an employee, contractor, or malicious third party with inappropriately assigned access will take advantage of that access. Sometimes, regulations exist that mandate access controls. To comply with such regulations, companies often need some way of providing meaningful evidence to auditors that explains how and why access was assigned within their environment.

For many enterprises, enforcing all such governance controls has been an ongoing challenge that is increasingly difficult to master. Business users are becoming more involved in driving the whole governance initiative. Business users more frequently request access to enterprise resources or delegate administration activities. Business users are more frequently involved in functions that were once considered to be the exclusive domain of the information technology department.

Enterprises seek a simplified and more business user-friendly experience that is easily customizable. In the past, enterprises were challenged by the lack of a unified governance suite offered by a single vendor. Provisioning, privileged access management, role management, and compliance products evolved independently of each other. This independent evolution led to customers implementing multiple products from multiple vendors as point solutions to address variant needs. As regulatory and provisioning requirements continue to grow and change, such multi-vendor solutions only increase the complexity and costs of managing and integrating these products. Enterprises end up relying heavily on each of these vendors for support. Enterprises end up committing significant resources to governance efforts for integration with little assurance that those efforts will prove successful.

A unified identity governance suite enables organizations to simplify access grants and audit access activities. Such a unified identity governance suite consolidates provisioning functions, privileged access functions, role management functions, policy management functions, and risk management functions. Through this consolidations, end-user productivity is increased, risk is reduced, operational efficiency is increase, and total cost is reduced. FIG. 1 is a block diagram that shows an example of some core components of a unified identity governance suite.

A unified identity governance suite can include an identity manager. Each user in an enterprise can have a separate identity. Such an identity manager can automate the administration of user access privileges across a company's resources, throughout the entire identity management life cycle—from initial on-boarding to final de-provisioning of an identity. An identity manager can help to provide information useful to comply with regulations. Such information might include an identification of the users that have access to each of an enterprise's resources. Such information might include an identification of the process through which each such user obtained access to each such resource. Such information might include an identification of the reasons that each such user has access to each such resource.

FIG. 2 is a block diagram that depicts an example of functions that can be performed by an identity manager. The identity manager's architecture can orchestrate complex information technology and business processes without requiring invasive changes to application infrastructure, policies, or procedures. The identity manager can distill core identity administration and provisioning functions into discrete layers. Changes to workflow, policy, data flow, or integration technology can be isolated within the respective functional layers, minimizing impact to applications. Configurations performed relative to the identity manager can be performed through a web interface. The identity manager may include an extensibility framework that allows the interface and its behavior to be tailored to the needs of each business.

An identity manger can offer a wide range of self-service functions that enable business users to register for an account and to manage their own profiles and credentials. An identity manager can provide a configurable interface through which end users can submit requests for accounts for themselves in the enterprise. A configurable workflow allows such requests to be approved before being granted. Users can be automatically notified regarding account details.

An identity manger can allow users to manage their own profile data. For example, an identity manager can allow users to change their e-mail identifier, postal address, telephone number, emergency contact information, password recovery questions and answers, etc. An identity manager can allow users to set up a proxy or delegate user to act on their behalf for a specified time period.

An identity manager can provide an interface through which each user can manage his own enterprise password, which he can use for single sign-on (SSO) purposes. The identity manager can synchronize this password across all target resources provisioned to the user in the enterprise. The identity manager can ensure that each password complies with enterprise password policies. The identity manager can be used to author such password policies. For the recovery of forgotten passwords, the identity manager can employ security challenge questions that were set during the user's first login or that were supplied when the user registered. The identity manager can provide random password generation capabilities that may be invoked during registration. The identity manager can enable administrators to reset user's passwords. The identity manager can randomly generate passwords to comply with password policies. The identity manager may send a randomly generated password to a user using various notification mechanisms such as e-mail, text message, etc. The identity manager can provide a password recovery mechanism that uses knowledge-based authentication or one time password-based challenge questions and responses.

Within an enterprise that includes an identity manager, each user can have a separate identity with its own state. This state can include a variety of attributes and corresponding values. The user's state can include attributes such as last login date and time, location from which last login occurred, last date and time of password change, quantity of incorrect login attempts, whether his account is currently active, locked, or suspended, etc. When a user exceeds an enterprise-wide specified maximum quantity of log-in attempts, that user's account can be at least temporarily locked out for some period of time, to prevent, for some period, further guesses by a possible hacker.

According to past approaches, all users within an enterprise were treated essentially in the same manner with regard to these lockout periods, regardless of who they were, their level of responsibility, their position in the organization, etc. Unfortunately, this one-size-fits-all type of lockout treatment can result in lockout periods being too lenient and insecure for users who have access to highly sensitive resources, and/or too restrictive for lower-level users who lack such access. Furthermore, such approaches did not consider the possibility that a user's position within an organization might change, potentially warranting different lockout handling as a result.

Additionally, account state information, including password state information (e.g., number of attempts at logging in, number of questions answered as part of password recovery process), has traditionally been stored in a variety of heterogeneous types of repositories coming from a variety of different vendors. Different repository types can represent account state information in different formats. In the past, client applications seeking to interact with each of these repositories had to do so by including different custom code for each different type of repository.

Furthermore, as is discussed above, an enterprise might need to be prepared to prove that it complies with certain regulations. This proof may be provided in the form of records created by an auditing subsystem. When a user submits a provisioning request—a request for access to some resource within the enterprise—it would be beneficial if a record of that request, and potentially its fulfillment also, could be generated and stored. Service Provisioning Markup Language (SPML) is the current language of choice for formatting provisioning requests. Clients typically make such requests through an SPML server that handles the requests. For security purposes, the SPML server performs authentication prior to handling an SPML request. However, for reasons of scalability (there might be thousands of users making such requests), an SPML administrator proxy account is typically the only account that authenticates with the SPML server. All users in the system then interact with the SPML server through this SPML administrator proxy account. The drawback of this approach is that an auditing system that seeks to record all of the activities performed by the SPML server does not truly know the identities of the users who initiated those activities; the SPML administrator proxy account is the only known account, which makes auditing information unreliable and less useful.

BRIEF SUMMARY OF THE INVENTION

According to one embodiment of the invention, different types of soft-lockout policies can be associated with different organizations (or groups) in an identity management system. Each soft-lockout policy can indicate different parameters such as a number of login attempts allowed and an amount of time that a user account will be locked-out if the maximum allowed attempts are exceeded unsuccessfully. Users can be associated with the different organizations. For each user, the soft-lockout policies for the organization with which that user is associated are applied to that user when that user attempts to log in. Thus, different groups of users can be handled with different security behaviors regarding unsuccessful login attempts. If, for example, a user were to become moved from one organization to another, then the soft-lockout policies associated with the user's new organization would become applicable to that user.

According to one embodiment of the invention, an intermediary layer between the client application and the various types of account state information repositories provides uniform methods that the client application can invoke to interact with the different repository types to access and modify account state information (e.g., password state information) without distinguishing between the repository types and their diverse formatting, thereby insulating the client application from each repository's peculiarities and simplifying client application development.

According to one embodiment of the invention, the real identity (e.g., username) of the user who makes an SPML request is passed within that SPML request by the SPML administrator proxy. The SPML server passes the SPML request along to an auditing layer of the identity management system, which uses the real identity contained therein to perform more accurate auditing functions that identify the actual requestor rather than just the SPML administrator proxy.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Group-Specific Password Lockout Policies

According to an embodiment of the invention, password lockout policies are mapped to organizations (i.e., user groups), and users are mapped to the organizations to which they belong. The password lockout policy to be applied to a user is the policy that is mapped to the organization to which that user belongs. This frees administrators from having to separately specify custom policies for each user while also allowing different users to be handled in a fitting manner. This also frees administrators from having to alter a user's lockout policy manually if the user changes organizations, since the policies are mapped to the organizations to which the users belong rather than the users themselves.

Figure 1:
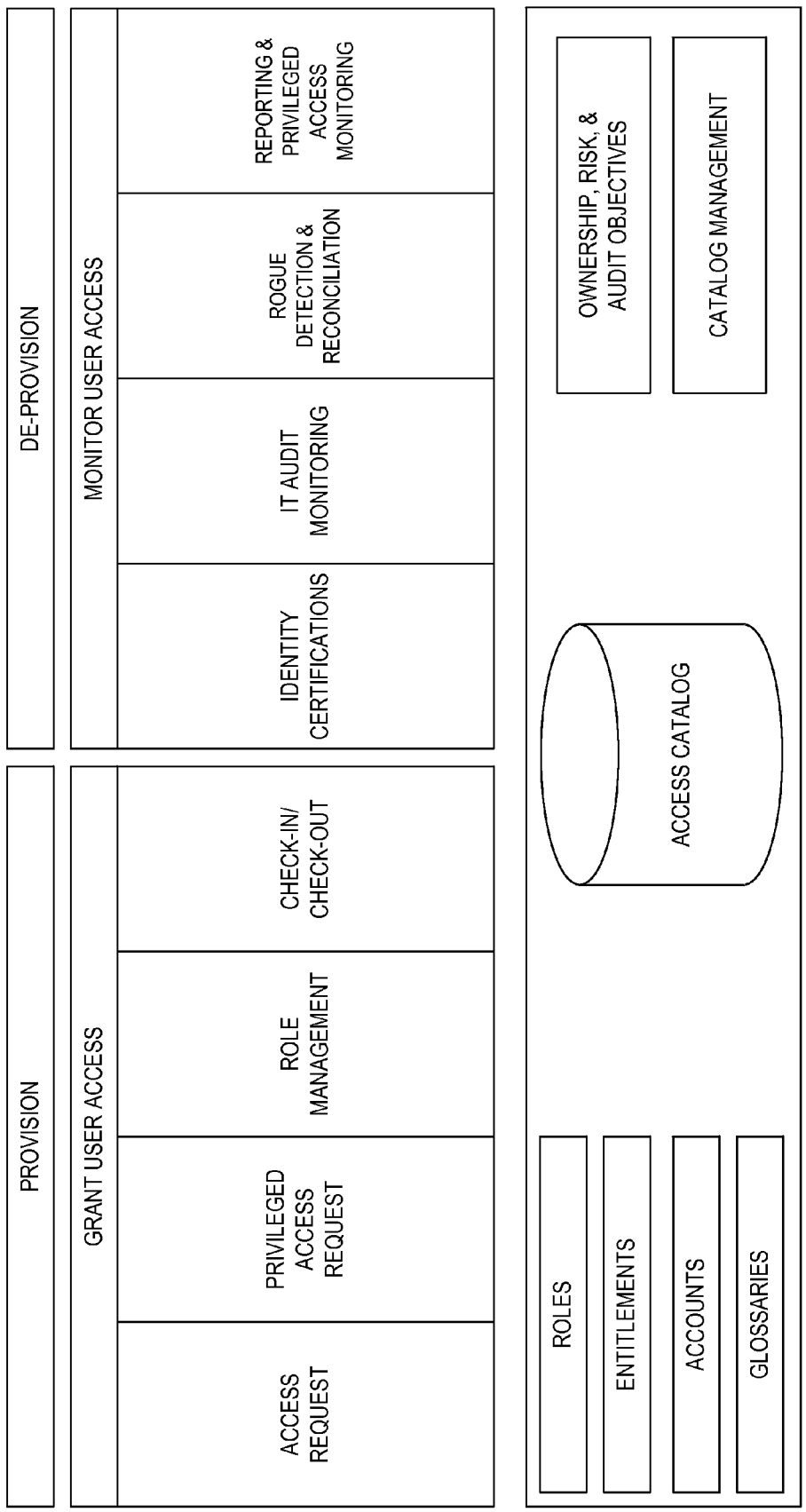
FIG. 1 is a block diagram that shows an example of some core components of a unified identity governance suite.
Figure 2:
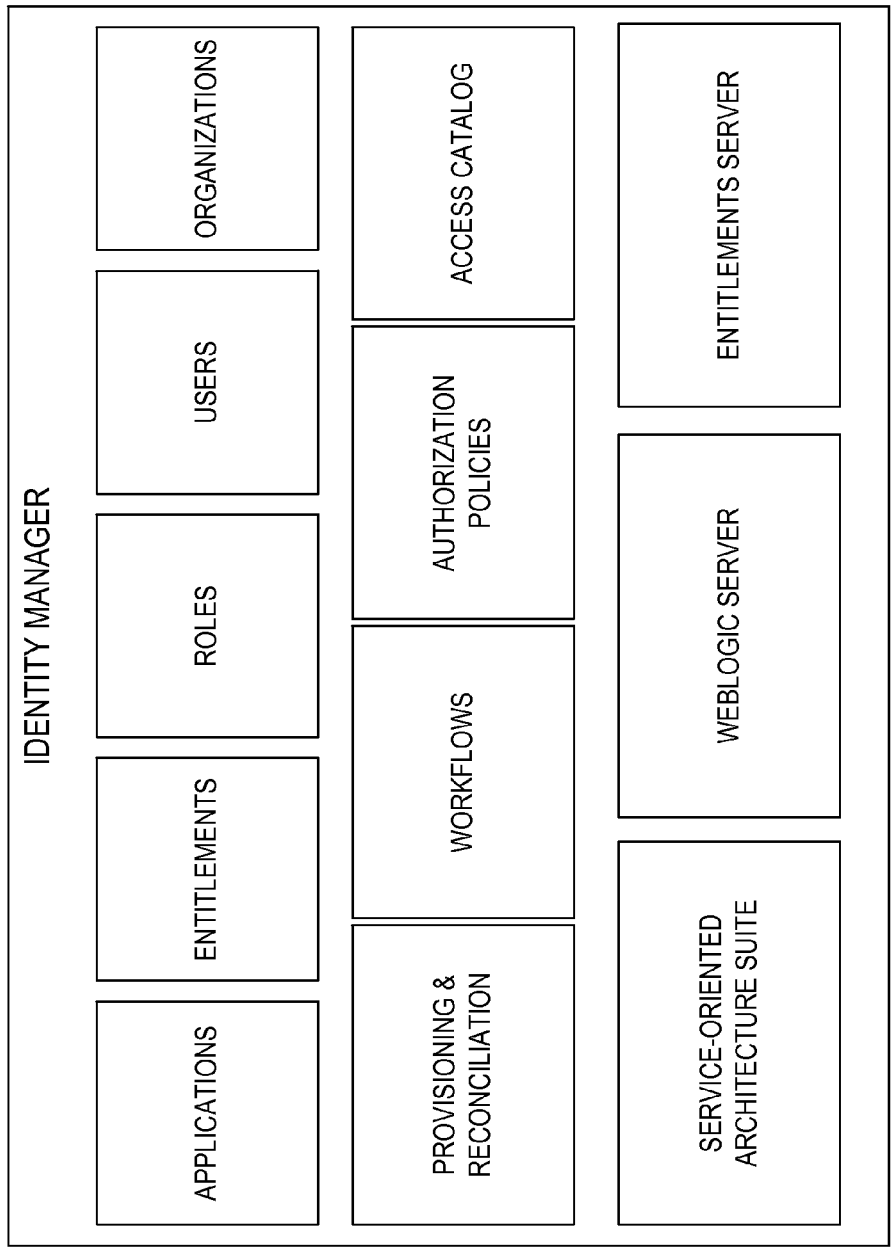
FIG. 2 is a block diagram that depicts an example of functions that can be performed by an identity manager.
Figure 3:
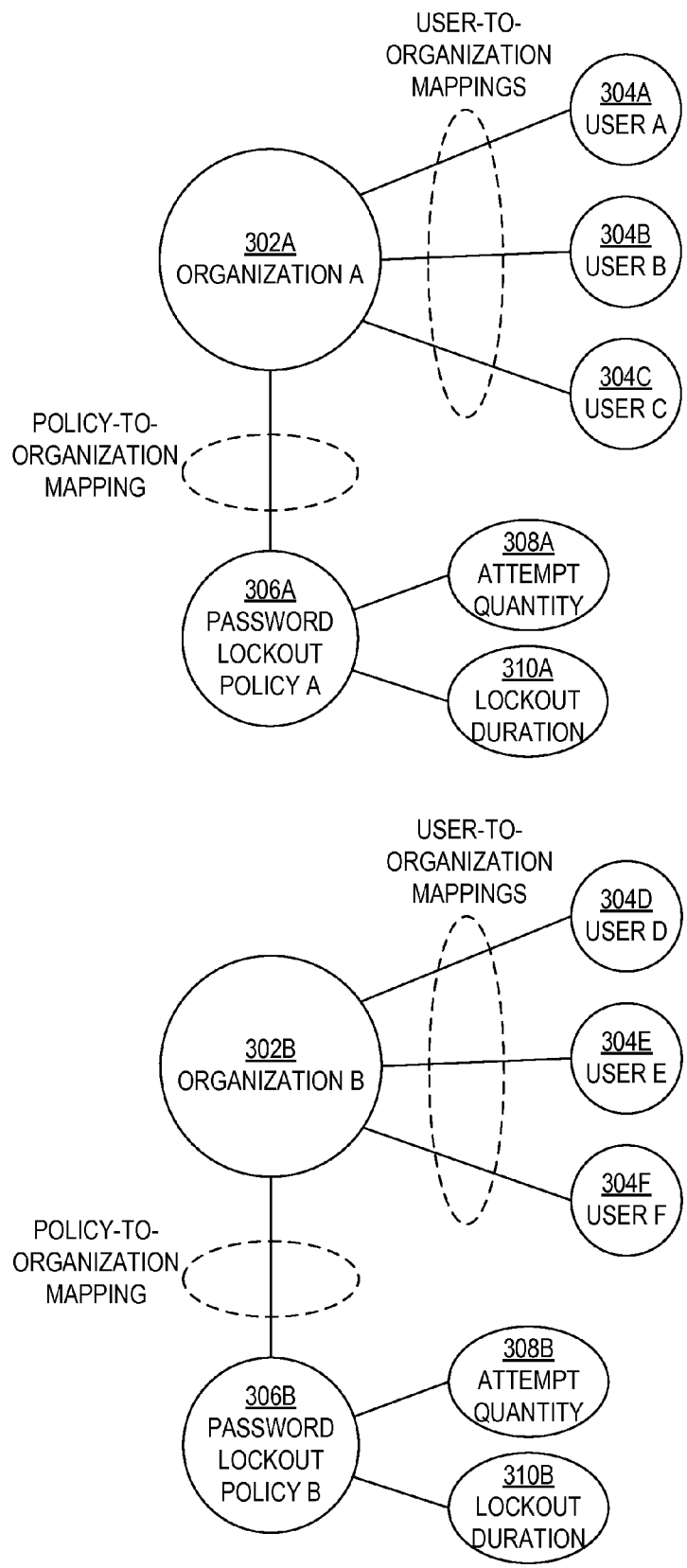
FIG. 3 is a block diagram that depicts an example of user-to-organization mappings used in concert with lockout policy-to-organization mappings, according to an embodiment of the invention.

FIG. 3 is a block diagram that depicts an example of user-to-organization mappings used in concert with lockout policy-to-organization mappings, according to an embodiment of the invention. As shown in FIG. 3, there are two separate organizations: organization A 302A, and organization B 302B. An enterprise could include any quantity of separate organizations. In one embodiment, such organizations can be hierarchically related to each other, but this is not required. As shown in FIG. 3 each organization is associated with, or mapped to, a separate set of users via user-to-organization mappings. For example, user A 304A, user B 304B, and user C 304C are in this example mapped to organization A 302A, thereby signifying that users 304A-C currently belong to, or are members of, organization A 302A. Continuing the example, user D 304D, user E 304E, and user F 304F are in this example mapped to organization B 302B, thereby signifying that users 304D-F currently belong to, or are members of, organization B 302B. In one embodiment of the invention, a user can belong to zero or more organizations. Although in one embodiment of the invention users are constrained to belong to no more than one organization at a time, in an alternative embodiment of the invention, users are allowed to belong concurrently to any quantity of different organizations.

As further shown in FIG. 3, each of organizations A-B can be associated with, or mapped to, a separate password lockout policy via a policy-to-organization mapping. For example, organization A 302A is shown being mapped to password lockout policy A 306A, while organization B 302B is shown being mapped to password lockout policy B 306B. Because password lockout policy A 306A is mapped to organization A 302A, password lockout policy A 306A is applicable to all users that are currently mapped to organization A 302A—in this example, users 304A-C. Similarly, because password lockout policy B 306B is mapped to organization B 302B, password lockout policy B 306B is applicable to all users that are currently mapped to organization B 302B—in this example, users 304D-F. Thus, in an embodiment, when determining which of several stored password lockout policies ought to be applied to a particular user who is failing to log-in to his account, the identity management system determines the organization to which that particular user is currently mapped, then determines the password lockout policy that is currently mapped to that organization, and then applies that password lockout policy to the particular user in order to decide how the user's log-in failure should be handled.

Password lockout policy A 306A differs in content from password lockout policy B 306B. As a result, the manner in which failed log-ins are handled under password lockout policy A 306A differs from the manner in which failed log-ins are handled under password lockout policy B 306B. In one embodiment of the invention, a repository can contain various password lockout policies. The identity management system can be used to create new password lockout policies which can be stored in the repository. All such policies can be formatted according to a common convention, with similar fields but differing values.

The identity management system can be used to edit or delete existing password lockout policies. The identity management system can be used to create a mapping between an existing password lockout policy and an organization. The identity management system can be used to delete a mapping between an existing password lockout policy and an organization. In one embodiment, password lockout policies persist within the repository regardless of whether those policies currently are or ever have been mapped to an organization. As a result, in one embodiment, the organization with which a password lockout policy is associated can be modified by deleting the mapping between that policy and the organization to which it is currently mapped, and then adding a mapping between that policy and a different organization. In one embodiment of the invention, a particular password lockout policy can be mapped to multiple different organizations. Under such circumstances, the particular password lockout policy is applicable to all users of all organizations to which the particular password lockout policy is currently mapped.

As is mentioned above, in one embodiment of the invention, organizations can be related to each other hierarchically. Thus, one organization may be a parent to one or more child organizations in a hierarchy. In one embodiment of the invention, a child organization that is not mapped to any password lockout policy inherits the password lockout policy that is mapped to its nearest ancestor organization in the organization hierarchy.

As is shown in FIG. 3, each password lockout policy can be associated with, or mapped to, a separate set of attribute values. Although each password lockout policy might be defined by the same set of attributes, each different policy can have different values assigned to those attributes. For example, as shown in FIG. 3, password lockout policy A 306A is mapped to attempt quantity 308A (an attribute) and lockout duraction 310A (an attribute), while password lockout policy B 306B is mapped to attempt quantity 308B (an attribute) and lockout duration 310B (an attribute). Athough both password lockout policies 306A-B have an attempt quantity attribute, the value of attempt quantity attribute 308A can differ from the value of attempt quantity attribute 308B. Similarly, although both password lockout policies 306A-B have a lockout duration attribute, the value of lockout duration attribute 308A can differ from the value of lockout duration attribute 308B. For example, the value of attempt quantity 308A might be 5, indicating that five failed login attempts are permitted before a user's account is at least temporarily locked out, but the value of the value of attempt quantity 308B might be only 2, indicating that just two failed login attempts are permitted before a user's account is at least temporarily locked out. Continuing the example, the value of lockout duration 310A might be 24 hours, indicating that the user's account will be locked out (and inaccessible to the user) for 24 hours following the maximum quantity of failed log-in attempts, the value of lockout duration 310B might be 1 week, indicating that the user's account will be locked out (and inaccessible to the user) for a whole week following the maximum quantity of failed log-in attempts.

As can be seen from the foregoing example, password lockout policy B 306B can be much less lenient than, and promote a higher level of security than that provided by password lockout policy A 306A. Thus, in the foregoing example, it may be appropriate for an administrator to assign password lockout policy A 306A to an organization to which low-level users are mapped, since those users are less likely to have access to highly sensitive or critical resources. Conversely, in the foregoing example, it may be appropriate for an administrator to assign password lockout policy B 306B to an organization to which high-level users (e.g., officers) are mapped, since those users are more likely to have access to highly sensitive or critical resources.

Although attempt quantity and lockout duration are shown as examples of attributes of password lockout policies in FIG. 3, alternative embodiments of the invention can involve password lockout policies that have additional, fewer, or different attributes than those discussed above. Furthermore, although the examples discussed above involve password lockout policies specifically, in alternative embodiments of the invention, different kinds of policies, which also can affect user state characteristics other than a password lockout period, also can associated with various organizations in a similar manner. For example, a policy might dictate a format that a user's password must follow (e.g., at least one capital letter and one number). For another example, a policy might express a number of challenge questions that are to be issued during a password recovery process. Such a policy might even specify the set of possible questions that are permitted to be used as challenge questions. Practically any state associated with a user's account can be governed by a policy that can be associated with, or mapped to, various organizations in an enterprise.

In an embodiment of the invention, password lockout policies do not automatically follow a particular user if that user is moved from a source organization to a destination organization. In such an embodiment, when the organization to which a user is mapped changes—either due to an administrator manually changing that mapping or due to the mapping being dynamically and automatically changed due to the user's attributes ceasing to satisfy some membership policy that is associated with the source organization—then the password lockout policy that is mapped to the source organization ceases to apply to the user, and the password lockout policy that is mapped to the destination organization begins to apply to the user. Administrators may find this effect useful because administrators consequently do not need to worry about changing a particular user's password lockout policies when that particular user's organization changes—perhaps due to that particular user assuming a different role in the organization. Instead of being associated directly with users, password lockout policies are, in an embodiment, directly associated with organizations, with which users are directly associated.

Figure 4:
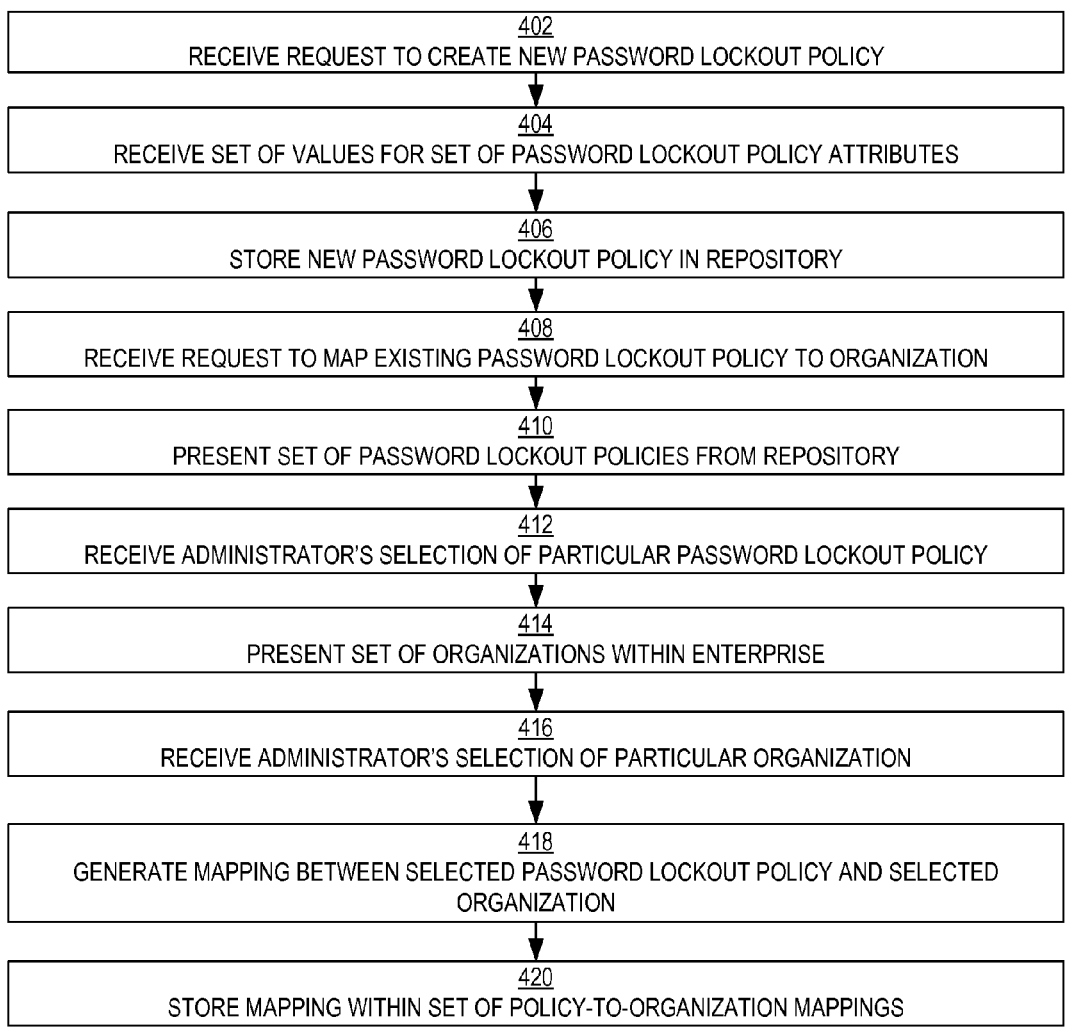
FIG. 4 is a flow diagram that illustrates an example of a technique for creating a password lockout policy and associating that password lockout policy with an organization, according to an embodiment of the invention.

FIG. 4 is a flow diagram that illustrates an example of a technique for creating a password lockout policy and associating that password lockout policy with an organization, according to an embodiment of the invention. In block 402, an identity management system receives a request to create a new password lockout policy. In block 404, the identity management system receives a set of values for a set of password lockout policy attributes (e.g., attempt quantity, lockout duration, etc.). In block 406, the identity management system stores the new password lockout policy in an enterprise-wide policy repository. In block 408, the identity management system receives a request to map an existing password lockout policy (potentially the newly created policy) to an organization. In block 410, the identity management system presents a set of password lockout policies currently contained in the policy repository. In block 412, the identity management system receives an administrator's selection of a particular password lockout policy from among the set. In block 414, the identity management system presents a set of existing organizations within the enterprise. In block 416, the identity management sytem receives an administrator's selection of a particular organization from among the set. In block 418, the identity management system generates a mapping between the selected password lockout policy and the selected organization. In block 420, the identity management system stores the mapping within a stored set of policy-to-organization mappings.

Figure 5:
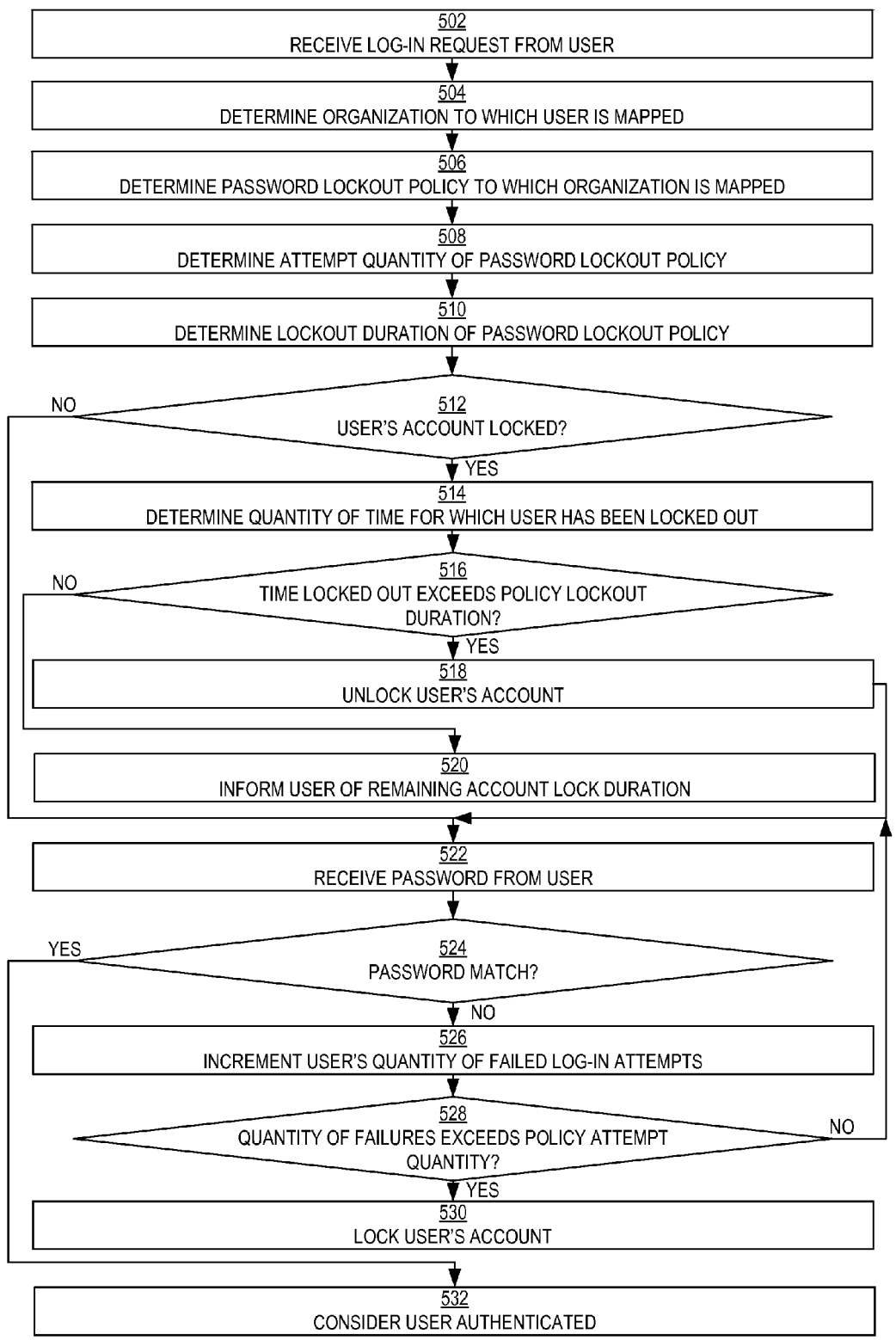
FIG. 5 is a flow diagram that illustrates an example of a technique for applying, to a user, a password lockout policy that is mapped to an organization to which the user is mapped, according to an embodiment of the invention.

FIG. 5 is a flow diagram that illustrates an example of a technique for applying, to a user, a password lockout policy that is mapped to an organization to which the user is mapped, according to an embodiment of the invention. In block 502, the identity management system receives a log-in request from a particular user. In block 504, the identity management system determines, based on stored user-to-organization mappings, a particular organization to which the particular user is mapped. In one embodiment, this mapping is expressed as an attribute of the particular user's state. In block 506, the identity management system determines, based on stored policy-to-organization mappings, a particular password lockout policy to which the particular organization is mapped. In block 508, the identity management system determines the value of the attempt quantity attribute of the particular password lockout policy. In block 510, the identity management system determines the value of the lockout duration attribute of the particular password lockout policy.

In block 512, the identity management system determines, from the particular user's state, whether the particular user's account is currently locked. If so, then control passes to block 514. Otherwise, control passes to block 522.

In block 514, the identity management system determines, based on the particular user's state, a quantity of time for which the particular user has been locked out. In block 516, the identity management system determines whether the quantity of time for which the particular user has been locked out exceeds the value of the lockout duration attribute of the particular password lockout policy. If so, then control passes to block 518. Otherwise, control passes to block 520.

In block 518, the identity management system unlocks the particular user's account by modifying the particular user's state. The modification may involve resetting a stored quantity of failed log-in attempts stored in the user's state. Control passes to block 522.

Alternatively, in block 520, the identity management system informs the particular user that his account will remain locked out until a specified date and time, based on the value of the lockout duration attribute of the particular policy. The technique illustrated in FIG. 5 concludes at this point.

Alternatively, in block 522, the identity management system receives a password from the particular user. In block 524, the identity management system determines whether the supplied password matches the password that is specified in the particular user's state. If the passwords match, then control passes to block 532. Otherwise, control passes to block 526.

In block 526, the identity management system increments a quantity of failed log-in attempts contained in the particular user's state. In block 528, the identity management system determines whether the quantity of failed log-in attempts exceeds the value of the attempt quantity attribute of the particular password lockout policy. If so, then control passes to block 530. Otherwise, the identity management system may inform the particular user that the supplied password is incorrect, and that he has a certain number of attempts remaining (determined based on the value of attempt quantity attribtute) before being locked out, and control passes back to block 522.

Alternatively, in block 530, the identity management system locks the particular user's account for an amount of time specified by the value of the lockout duration attribute. The identity management system may do so by modifying the paticular user's state to indicate that the user's account is locked, and the date and time at which the particular user's account became locked. The identity management system may inform the particular user that his account will remain locked for an amount of time that is based on the value of the lockout duration attribute. The technique illustrated in FIG. 5 concludes at this point.

Alternatively, in block 532, the identity management system accepts the particular user's password and considers the user authenticated. As part of this acceptance, the identity management system may reset a quantity of failed log-in attempts that are specified in the particular user's state. Thereafter, the identity management system may determine whether the particular is authorized to access specific enterprise resources to which the particular user seeks access. The technique illustrated in FIG. 5 concludes at this point.

Beneficially, embodiments of the invention allow different kinds of users to be handled with different degrees of security when deciding how many login attempts those users will receive and for how long those users will be locked out of their accounts if those attempts are exceeded. Embodiments also free administrators from having to define custom individual policies for each separate user. Embodiments also free administrators from having to change a user's lockout policy manually if that user's role changes, since the user automatically gets handled with the lockout policies that are mapped to whichever organization currently includes that user.

Uniform Interface for Heterogeneous Account State Repositories

As is mentioned above, account state information, including password state information (e.g., number of attempts at logging in, number of questions answered as part of password recovery process), has traditionally been stored in a variety of heterogeneous types of repositories coming from a variety of different vendors. Different repository types can represent account state information in different formats. This has traditionally complicated the development of client applications that seek to interface directly with those repositories, as each separate client application traditionally had to be developed to include code that enabled that client application to interface with a repository of a specific type.

An embodiment of the invention permits a client application to invoke a set of uniform methods exposed by an intermediary layer in order to interact with diverse user identity repository types without specially considering repository-specific interaction details, which are all handled by the intermediary layer. The same method can interact with different repository types in different manners in order to perform the same type of operation relative to those repositories.

Figure 6:
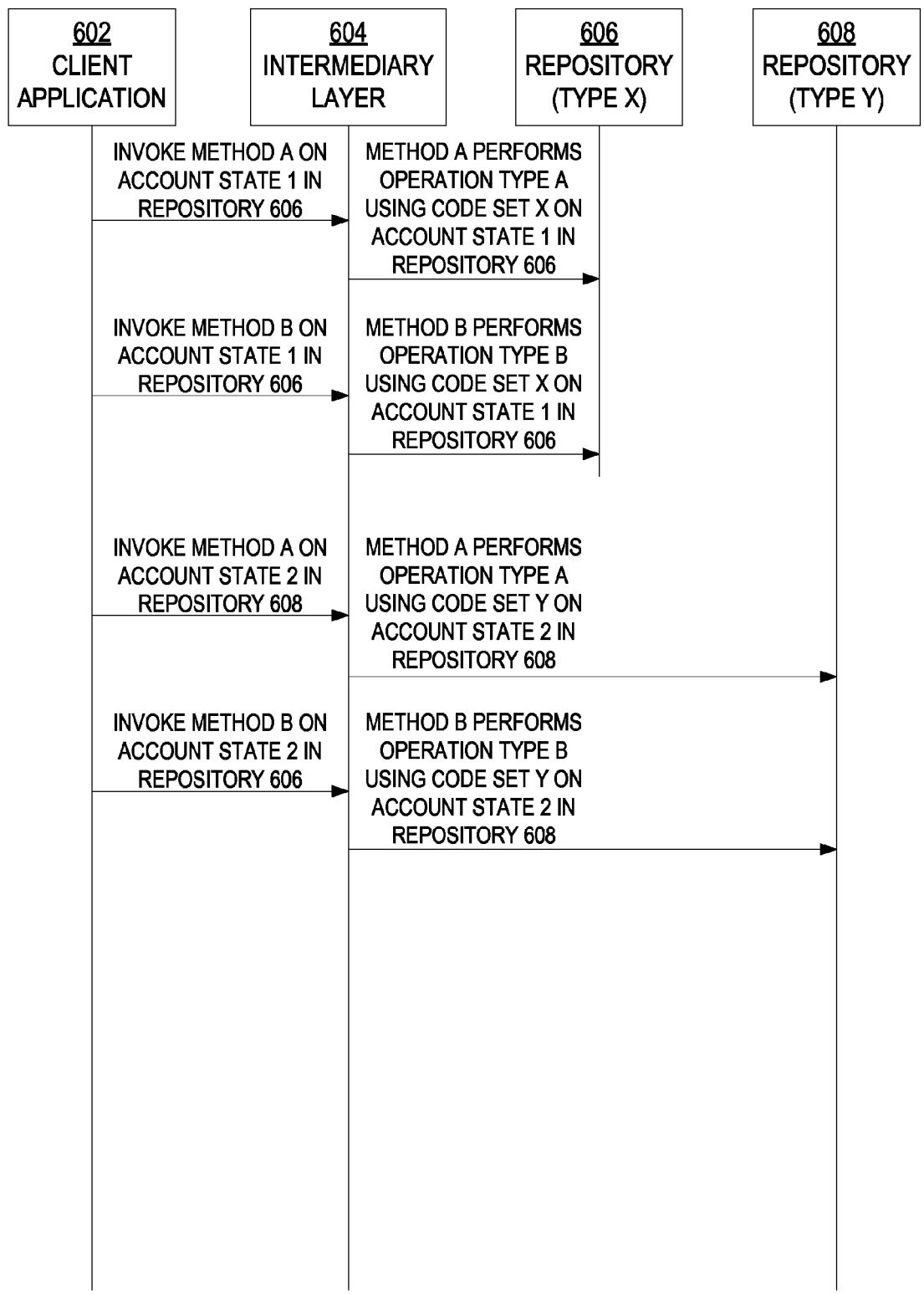
FIG. 6 is a block diagram that shows an example of a technique by which a client application can interact with heterogeneous repository types through a uniform interface provided by an intermediary layer.

FIG. 6 is a block diagram that shows an example of a technique by which a client application can interact with heterogeneous repository types through a uniform interface provided by an intermediary layer. The intermediary layer can be a part of the identity management system discussed above. As shown in FIG. 6, a client application 602 can interface with an intermediary layer 604, which in turn can interface with repositories of different types on behalf of client application 602. In FIG. 6, these heterogeneous repositories include repository (type X) 606 and repository (type Y) 608. Repositories 606 and 608 may store similar account state information according to different storage formats. Additionally, repositories 606 and 608 may expose vastly different user interface methods for accessing, creating, deleting, and modifying account state information. However, according to an embodiment, intermediary layer 604 exposes, to client application 602, a uniform set of methods that the client can invoke to access account state information in either of repositories 606 and 608. Client application 602 is therefore insulated from the differences in the interfaces that repositories 606 and 608 expose. Intermediary layer 604 includes a set of code specific to each of repositories 606 and 608, and executes the code appropriate to the repository with which client application 602 seeks to interact. A different code set exists for each different repository type. Each method exposed by intermediary layer 604 can include some code from each of the different repository type-specific code sets. Although a particular method may include code from multiple code sets, all code within the particular method performs the same operation, but potentially in a different manner due to repository differences.

As shown in FIG. 6, client application 602 invokes a method A on account state 1 stored in repository 606. In response to this invocation, intermediary layer 604 executes code set X, which is contained in its implementation of method A and specific to the type of respository 606. Code set X performs an operation of type A (corresponding to method A) relative to account state 1 stored in repository 606.

Client application 602 might want to perform a different operation relative to the same account state in the same repository. As shown in FIG. 6, client application 602 invokes a method B on account state 1 stored in repository 606. In response to this invocation, intermediary layer 604 executes code set X, which is contained in its implementation of method B and specific to the type of respository 606.

Code set X performs an operation of type B (corresponding to method B) relative to account state 1 stored in repository 606.

Client application 602 might want to perform an operation of type A (mentioned above) relative to a different account state in a different repository. As shown in FIG. 6, client application 602 invokes method A (mentioned above) on account state 2 stored in repository 608. In response to this invocation, intermediary layer 604 executes code set Y, which is also contained (along with the aforementioned code set X) in its implementation of method A but specific to the type of respository 608 rather than repository 606. Code set Y performs an operation of type A (corresponding to method A) relative to account state 2 stored in repository 606. The manner in which code set Y performs the operation of type A may differ from the manner in which code set X performs the operation of type A due to the difference between repositories 606 and 608.

Client application 602 might also want to perform an operation of type B (mentioned above) relative to that account state 2 in that repository 608. As shown in FIG. 6, client application 602 invokes method B (mentioned above) on account state 2 stored in repository 608. In response to this invocation, intermediary layer 604 executes code set Y, which is also contained (along with the aforementioned code set X) in its implementation of method B but specific to the type of respository 608 rather than repository 606. Code set Y performs an operation of type B (corresponding to method B) relative to account state 2 stored in repository 608. The manner in which code set Y performs the operation of type B may differ from the manner in which code set X performs the operation of type B due to the difference between repositories 606 and 608.

Beneficially, embodiments of the invention discussed above can increase the flexibility with which client applications can deal with a diverse variety of user account state repository types. Embodiments of the invention can ease the task of developing client applications that might interact with such a diverse variety of repository types. This enables client applications to retrieve and modify user password state information (e.g., how many password attempts failed, number of questions answered during recovery process, etc.) without specifically accounting for peculiarities in the way that different repository vendors permit interactions with their types of repositories.

Propagating Real User Identity in SPML Calls from Proxy

As is mentioned above, for scalability reasons, SPML provisioning requests from multiple enterprise users have been made through a single SPML proxy account, so that only the single SPML proxy account (and not each individual user) needs to undergo authentication with an SPML server. However, as is discussed above, when all provisioning requests originate from the same SPML proxy account, an auditing system that records all such request as having come from that SPML proxy account is not very useful for establishing compliance with regulations.

Therefore, in one embodiment of the invention, the real identity (e.g., username) of the user who makes an SPML request is passed within that SPML request by the SPML administrator proxy. The SPML server passes the SPML request along to an auditing layer of the identity management system, which uses the real identity contained therein to perform more accurate auditing functions that identify the actual requestor rather than just the SPML administrator proxy. Auditing of provisioning requests made using SPML (which is the standard way of making such requests) can be performed with accuracy regarding user identities without requiring the SPML server to separately authenticate every such user (of which there might be thousands). An SPML server can continue to perform authentication relative to just the SPML administrator proxy, but can enable accurate auditing to be performed by passing along the real user identity as included in the SPML request. Additionally, because only the SPML administrator proxy needs to be authenticated, there is no need to maintain authentication information for all users in the provisioning directory.

Figure 7:
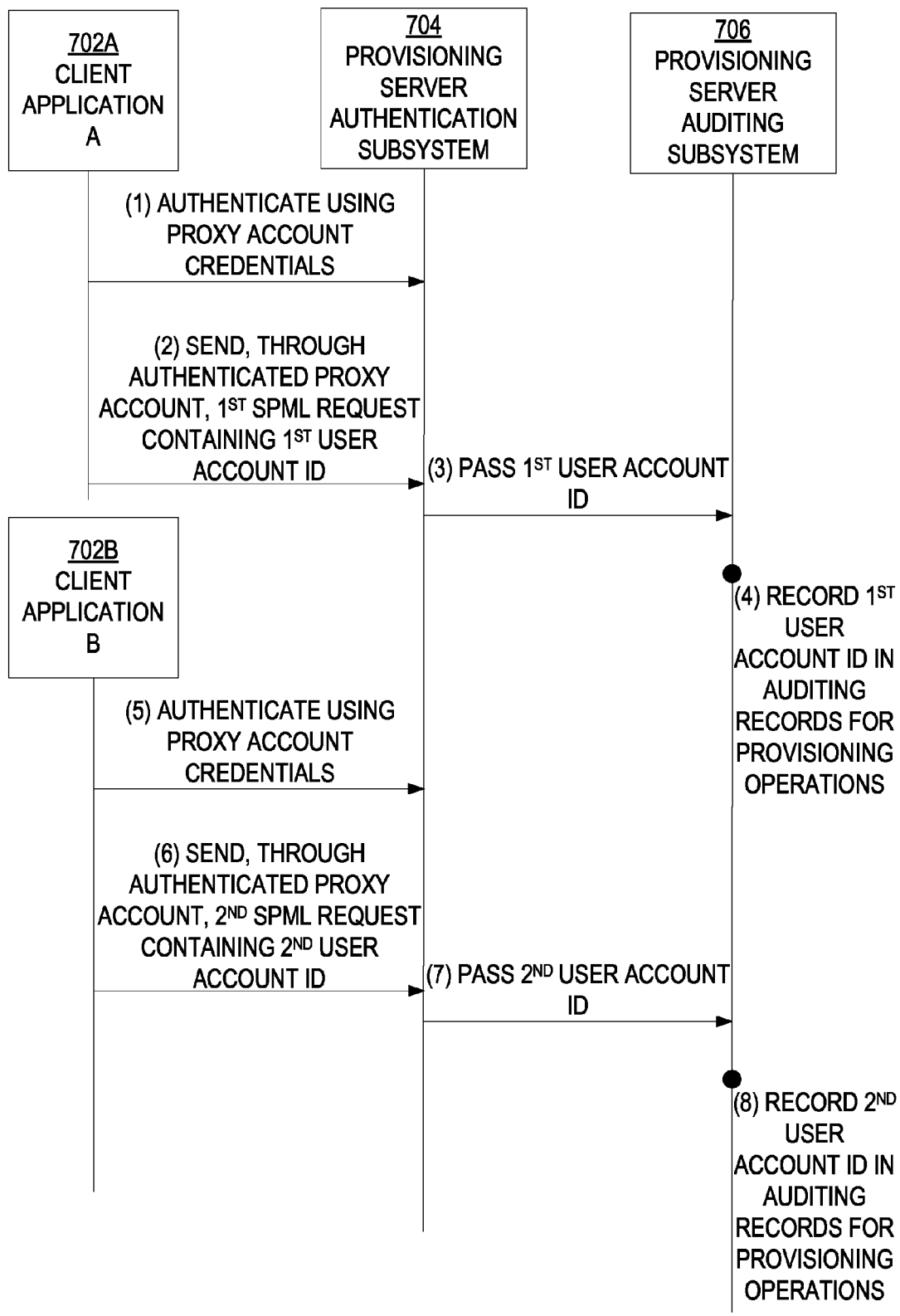
FIG. 7 is a block diagram that illustrates a technique for passing an actual user identity within an SPML provisioning call made to an SPML server from a proxy account so that an auditing subsystem can generate and record auditing records that accurately reflect the actual users for which provisioning was performed in an enterprise, according to an embodiment of the invention.

FIG. 7 is a block diagram that illustrates a technique for passing an actual user identity within an SPML provisioning call made to an SPML server from a proxy account so that an auditing subsystem can generate and record auditing records that accurately reflect the actual users for which provisioning was performed in an enterprise, according to an embodiment of the invention. Two client applications, client application A 702A and client application B 702B, both can authenticate using the same SPML proxy account with a provisioning server authentication subsystem 704. Each of client applications 702A-B is configured to pass, within the SPML request itself, the user identity of that client application's actual user. Provisioning server authentication subsystem 704, in turn, is configured to extract that user identity from the SPML request and pass it along to a provisioning server auditing subsystem 706. Provisioning server auditing subsystem 706 records the extracted user identity within auditing records that it generates and stores in making a history of provisioning operations occurring within the enterprise.

According to the example shown in FIG. 7, client application A 702A authenticates with provisioning server authentication subsystem 704 using the proxy account credentials. Client application A 702A sends, through the authenticated proxy account, a first SPML request containing a first user account identifier. In turn, provisioning server authentication subsystem 704 extracts the first user account identifier from the first SPML request and passes the first user account identifier on to provisioning server auditing subsystem 706. Provisioning server auditing subsystem 706 then records the first user account identifier within auditing records for the provisioning operation that was performed in response to the first SPML request, thereby identifying the actual user of client application A 702A.

Continuing the example, client application B 702B authenticates with provisioning server authentication subsystem 704 using the same proxy account credentials that client application A 702A used. Client application B 702B sends, through the authenticated proxy account, a second SPML request containing a second user account identifier. In turn, provisioning server authentication subsystem 704 extracts the second user account identifier from the second SPML request and passes the second user account identifier on to provisioning server auditing subsystem 706. Provisioning server auditing subsystem 706 then records the second user account identifier within auditing records for the provisioning operation that was performed in response to the second SPML request, thereby identifying the actual user of client application B 702B.

According to an embodiment, the requestor ID (identifying the user rather than the SPML administrator proxy) is passed from the client to the SPML server within the SPML request. The SPML server receives this requestor ID and sets the user context equal to its value, if it is specified. Otherwise, the user context is set to the SPML administrator proxy ID. The auditing subsystem performs auditing functions, recording activities related to the provisioning operations requested in the SPML request, in association with the user specified by the user context. The user of the client application supplies his own username and password to the client application. Services provided by the organization's systems maintain, usually in secure and encrypted form, credentials for the SPML administrator proxy. These services can use these credentials to log-in to the SPML provisioning server on behalf of the user and the client application. The SPML provisioning server can authenticate using the credentials provided and perform the requested provisioning. The SPML request can also contain the user's username and password, which the SPML provisioning server can use to identify the actor associated with the provisioning operations in auditing records that it generates and stores.

Beneficially, an embodiment of the invention permits an identity management system to perform accurate auditing functionality while avoiding the need to authenticate every user with the SPML server separately.

Hardware Overview

Figure 8:
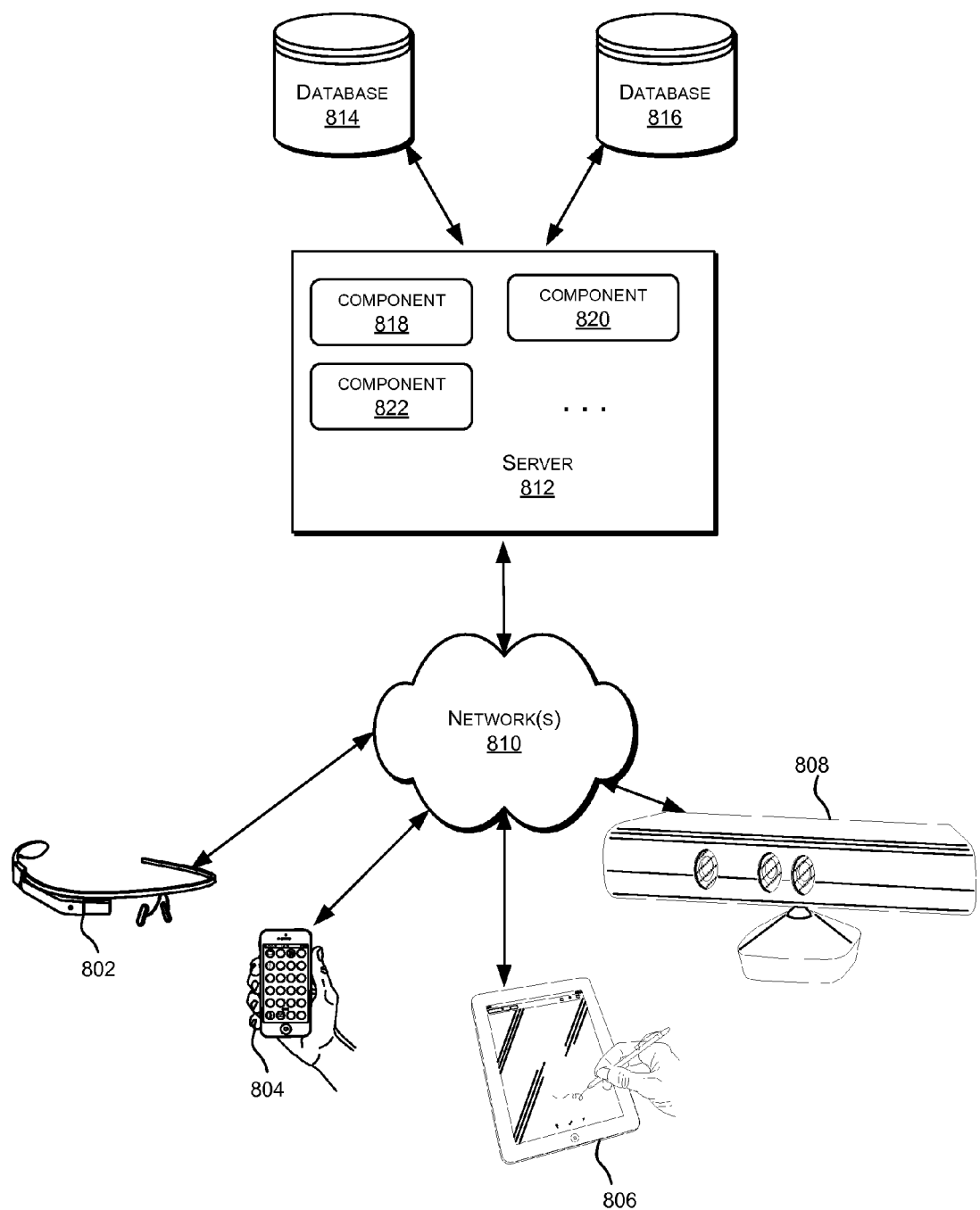
FIG. 8 depicts a simplified diagram of a distributed system for implementing one of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 9, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like.

Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, which are adapted to store, update, and retrieve data in response to SQL-formatted commands.

Figure 9:
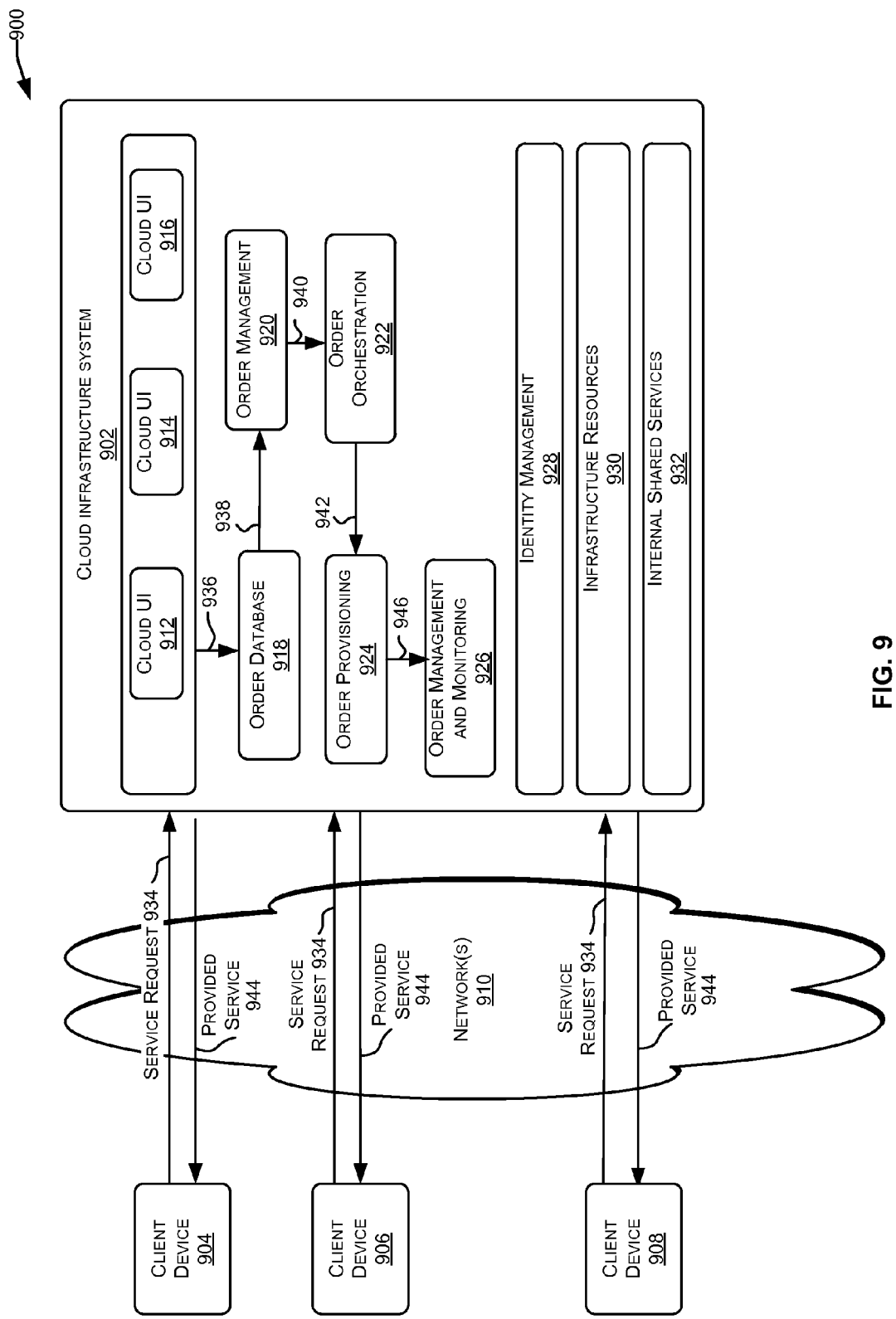
FIG. 9 is a simplified block diagram of components of a system environment by which services provided by the components of an embodiment system may be offered as cloud services, in accordance with an embodiment of the present disclosure.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
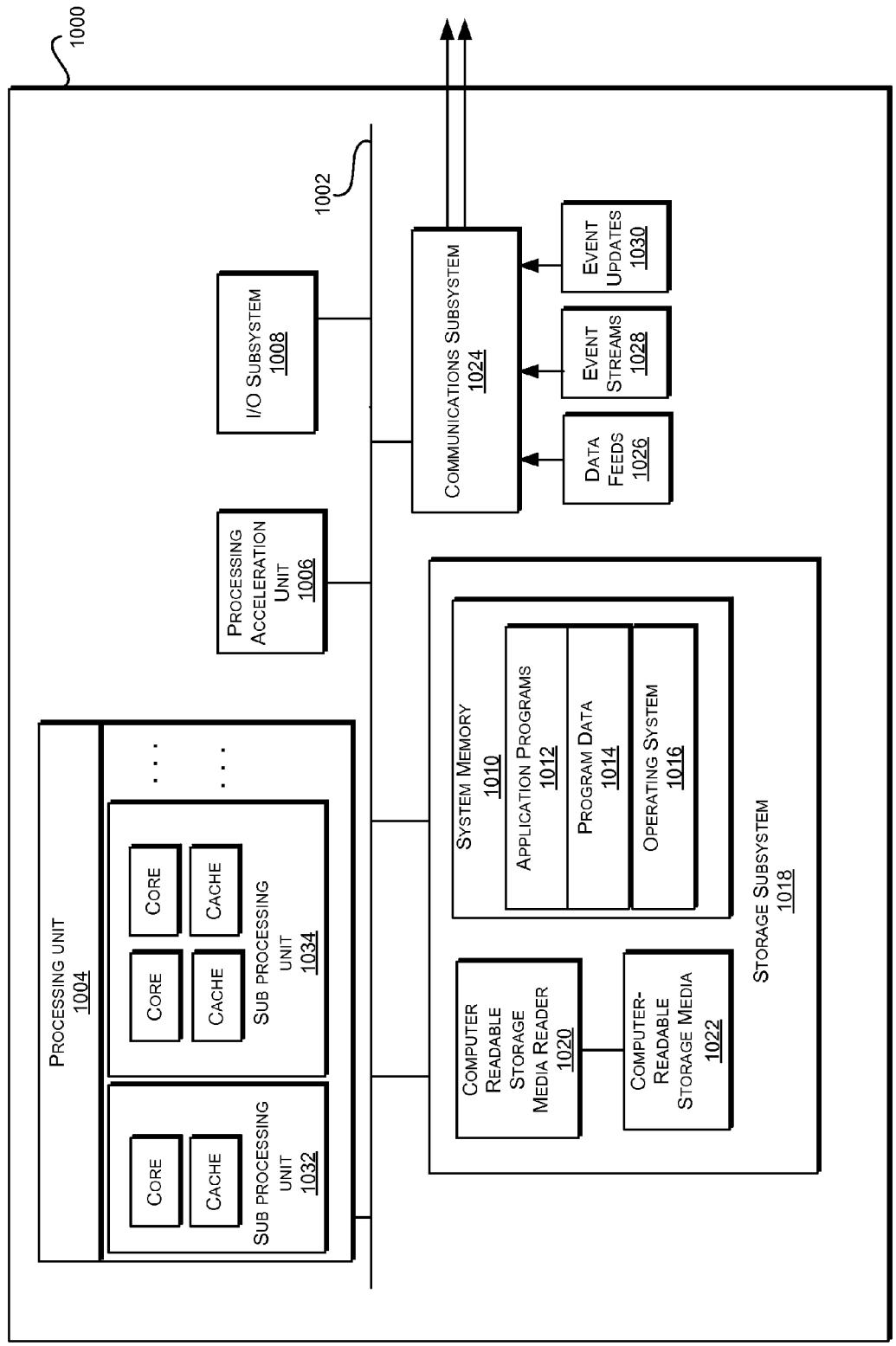
FIG. 10 illustrates an example of a computer system in which various embodiments of the present invention may be implemented.

FIG. 10 illustrates an example computer system 1000 in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like. Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    exposing, to a first client application, a first invocable method for performing a first type of operation relative to account state information stored in a repository;
    detecting a first invocation of the first invocable method by the first client application;
    determining, based on the first invocation, a first repository in which first account state information pertaining to a first account is stored;
    determining, by the first invocable method, based on first metadata, a first repository type of the first repository, wherein the first metadata maps the first account to the first repository, and the first metadata maps the first repository to the first repository type;
    in response to determining, based on mappings within the first metadata, that the first account is maintained within the first repository that is of the first repository type, executing first code, contained within the first invocable method, that performs the first type of operation relative to the first account state information pertaining to the first account stored in the first repository;
    based on a second invocation of the first invocable method by the first client application, determining, by the first invocable method, using second metadata, a second repository type of a second repository in which second account state information pertaining to a second account is stored, wherein the second metadata maps the second account to the second repository, and the second metadata maps the second repository to the second repository type, and wherein the second repository type differs from the first repository type; and
    based on determining that the second account is maintained within the second repository, executing second code, contained within the first invocable method, that performs the first type of operation relative to the second account state information pertaining to the second account stored in the second repository of the second repository type, wherein the second code differs from the first code.

2. The method of claim 1, wherein the first repository type is a relational database, and wherein the second repository type is not a relational database.

3. The method of claim 1, wherein the first repository type is a lightweight directory access protocol (LDAP) directory, and wherein the second repository type is not an LDAP directory.

4. The method of claim 1, wherein the first type of operation is an operation that retrieves, from the repository, a quantity of time for which the account state information indicates that a user has been locked out of a system.

5. The method of claim 1, wherein the first type of operation is an operation that changes the account state information to specify that an account is unlocked.

6. The method of claim 1, wherein the first type of operation is an operation that retrieves a password contained within the account state information.

7. The method of claim 1, wherein the first type of operation is an operation that increments a current quantity of failed log-in attempts specified within the account state information.

8. The method of claim 1, wherein the first type of operation is an operation that changes the account state information to specify that an account is locked until a specified date and a specified time.

9. The method of claim 1, wherein the first type of operation is an operation that resets, to zero, a quantity of failed log-in attempts specified within the account state information.

10. The method of claim 1, further comprising:
    exposing, to the first client application, a second invocable method for performing a second type of operation relative to the account state information stored in the repository;
    detecting a first invocation of the second invocable method by the first client application;

determining, based on the first invocation of the second invocable method, the first repository in which the first account state information pertaining to the first account is stored;
determining, by the second invocable method, the first repository type of the first repository; and
executing third code, contained within the second invocable method, that performs the second type of operation relative to the first account state information pertaining to the first account stored in the first repository;
wherein the second type of operation differs from the first type of operation;
wherein the second invocable method contains fourth code that performs the second type of operation relative to the second account state information stored in the second repository of the second repository type, the second repository type differing from the first repository type; and
wherein the fourth code differs from the third code.

11. The method of claim 10, further comprising:
detecting a second invocation of the second invocable method by the first client application;
determining, based on the second invocation of the second invocable method, a second repository in which the second account state information pertaining to the second account is stored;
determining, by the second invocable method, the second repository type of the second repository; and
executing the fourth code, contained within the second invocable method, that performs the second type of operation relative to the second account state information pertaining to the second account stored in the second repository;
wherein the second repository type differs from the first repository type;
wherein the second repository stores the second account state information pertaining to the second account in a second format that differs from a first format in which the first repository stores the first account state information pertaining to the first account.

12. The method of claim 1, further comprising:
exposing, to a second client application, the first invocable method for performing the first type of operation relative to the account state information stored in the repository;
detecting a third invocation of the first invocable method by the second client application;
determining, based on the third invocation, the first repository in which the first account state information pertaining to the first account is stored;
determining, by the first invocable method, the first repository type of the first repository; and
executing the first code, contained within the first invocable method, that performs the first type of operation relative to the first account state information pertaining to the first account stored in the first repository;
wherein the second client application is separate from the first client application.

13. A non-transitory computer-readable storage memory storing instructions which, when executed by one or more processors, cause the one or more processors to perform operations comprising:
exposing, to a first client application, a first invocable method for performing a first type of operation relative to account state information stored in a repository;
detecting a first invocation of the first invocable method by the first client application;
determining, based on the first invocation, a first repository in which first account state information pertaining to a first account is stored;
determining, by the first invocable method, based on first metadata, a first repository type of the first repository, wherein the first metadata maps the first account to the first repository, and the first metadata maps the first repository to the first repository type;
in response to determining, based on mappings within the first metadata, that the first account is maintained within the first repository that is of the first repository type, executing first code, contained within the first invocable method, that performs the first type of operation relative to the first account state information pertaining to the first account stored in the first repository;
based on a second invocation of the first invocable method by the first client application, determining, by the first invocable method, using second metadata, a second repository type of a second repository in which second account state information pertaining to a second account is stored, wherein the second metadata maps the second account to the second repository, and the second metadata maps the second repository to the second repository type, and wherein the second repository type differs from the first repository type;
based on determining that the second account is maintained within the second repository, executing second code, contained within the first invocable method, that performs the first type of operation relative to the second account state information pertaining to the second account stored in the second repository of the second repository type, wherein the second code differs from the first code.

14. The non-transitory computer-readable storage memory of claim 13, wherein the operations further comprise:
exposing, to the first client application, a second invocable method for performing a second type of operation relative to the account state information stored in the repository;
detecting a first invocation of the second invocable method by the first client application;
determining, based on the first invocation of the second invocable method, the first repository in which the first account state information pertaining to the first account is stored;
determining, by the second invocable method, the first repository type of the first repository; and
executing third code, contained within the second invocable method, that performs the second type of operation relative to the first account state information pertaining to the first account stored in the first repository;
wherein the second type of operation differs from the first type of operation;
wherein the second invocable method contains fourth code that performs the second type of operation relative to the second account state information stored in the second repository of the second repository type, the second repository type differing from the first repository type; and
wherein the fourth code differs from the third code.

15. The non-transitory computer-readable storage memory of claim 14, wherein the operations further comprise:
detecting a second invocation of the second invocable method by the first client application;

determining, based on the second invocation of the second invocable method, a second repository in which the second account state information pertaining to the second account is stored;

determining, by the second invocable method, the second repository type of the second repository; and executing the fourth code, contained within the second invocable method, that performs the second type of operation relative to the second account state information pertaining to the second account stored in the second repository;

wherein the second repository type differs from the first repository type;

wherein the second repository stores the second account state information pertaining to the second account in a second format that differs from a first format in which the first repository stores the first account state information pertaining to the first account.

16. The non-transitory computer-readable storage memory of claim 13, wherein the operations further comprise:

exposing, to a second client application, the first invocable method for performing the first type of operation relative to the account state information stored in the repository;

detecting a third invocation of the first invocable method by the second client application;

determining, based on the third invocation, the first repository in which the first account state information pertaining to the first account is stored;

determining, by the first invocable method, the first repository type of the first repository; and executing the first code, contained within the first invocable method, that performs the first type of operation relative to the first account state information pertaining to the first account stored in the first repository;

wherein the second client application is separate from the first client application.

* * * * *

UNITED STATES PATENT AND TRADEMARK OFFICE
CERTIFICATE OF CORRECTION

PATENT NO. : 9,450,955 B2
APPLICATION NO. : 14/596097
DATED : September 20, 2016
INVENTOR(S) : Jagtap et al.

It is certified that error appears in the above-identified patent and that said Letters Patent is hereby corrected as shown below:

On the Title Page

On page 2, Column 2, under Other Publications, Line 5, delete "2015" and insert -- 2014 --, therefor.

On page 2, Column 2, under Other Publications, Line 7, after "7/" insert -- pdf/ --.

In the Specification

In Column 6, Line 63, delete "duraction" and insert -- duration --, therefor.

In Column 6, Line 65, delete "Athough" and insert -- Although --, therefor.

In Column 8, Line 28, delete "sytem" and insert -- system --, therefor.

In Column 9, Line 29, delete "attribtute)" and insert -- attribute) --, therefor.

In Column 9, Line 35, delete "paticular" and insert -- particular --, therefor.

In Column 10, Line 57, delete "respository" and insert -- repository --, therefor.

In Column 10, Line 67, delete "respository" and insert -- repository --, therefor.

In Column 11 Line 12, delete "respository" and insert -- repository --, therefor.

In Column 11, Line 27, delete "respository" and insert -- repository --, therefor.

In Column 21, Lines 48-54, delete "Macintosh®, and/or Linux operating systems, a variety of commercially-available UNIX® or UNIX-like operating systems (including without limitation the Signed and Sealed this
Twelfth Day of September, 2017

Joseph Matal
*Performing the Functions and Duties of the*
*Under Secretary of Commerce for Intellectual Property and*
*Director of the United States Patent and Trademark Office* variety of GNU/Linux operating systems, the Google Chrome® OS, and the like) and/or mobile operating systems such as iOS, Windows® Phone, Android® OS, BlackBerry® 10 OS, and Palm® OS operating systems." and insert the same on Column 21, Line 47, after "Apple" as a continuation of paragraph.